A. STRAND.
MOTOR CYCLE.
APPLICATION FILED OCT. 11, 1912. RENEWED DEC. 9, 1914.
1,143,793.
Patented June 22, 1915.
2 SHEETS—SHEET 1.
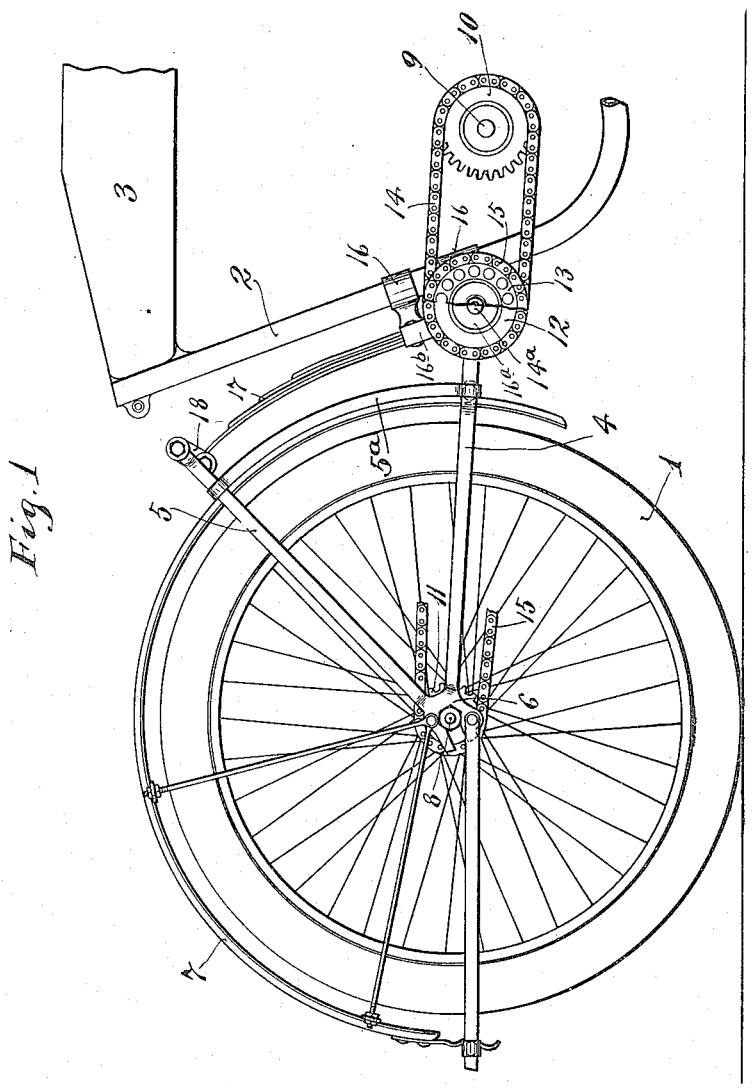

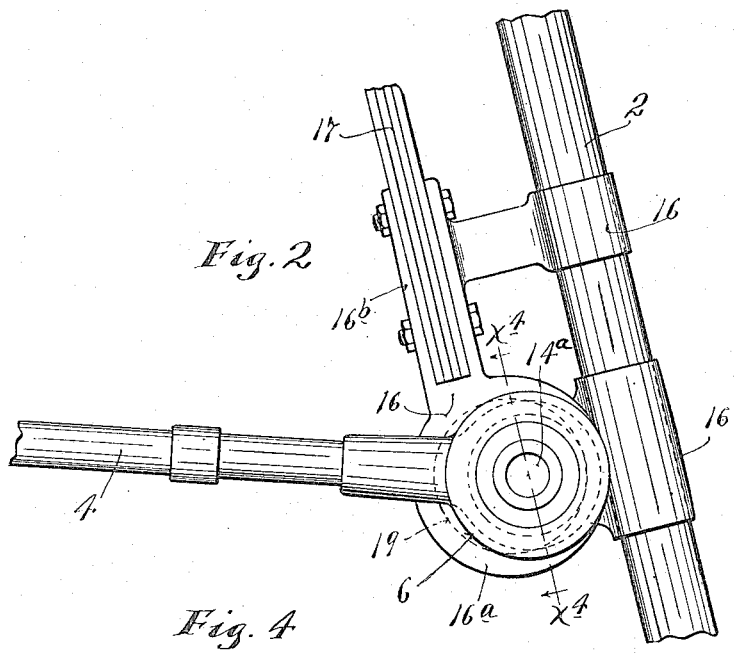
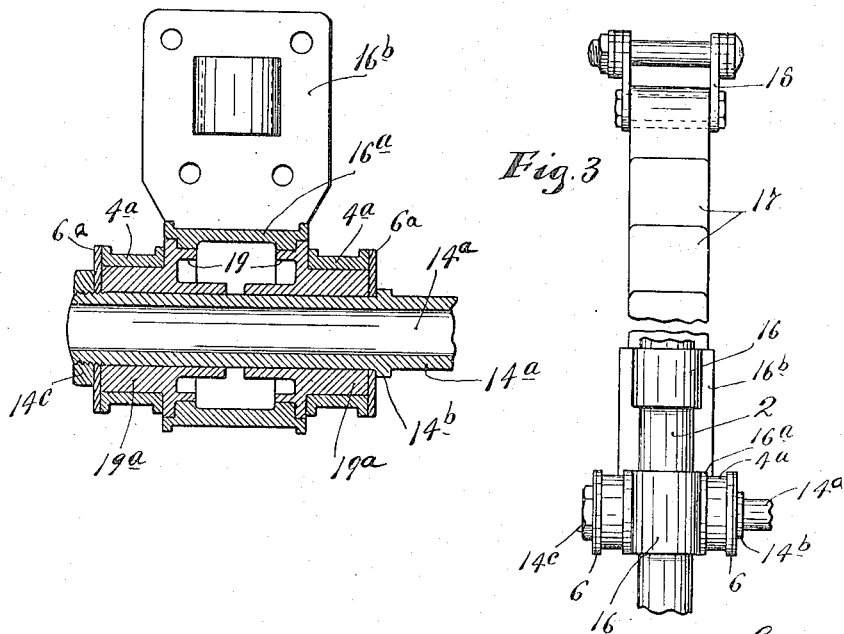

UNITED STATES PATENT OFFICE.

ANDREW STRAND, OF MINNEAPOLIS, MINNESOTA, ASSIGNOR TO JOERNS MOTOR MANUFACTURING COMPANY, OF ST. PAUL, MINNESOTA, A CORPORATION.

MOTOR-CYCLE.

1,143,793.  Specification of Letters Patent.  Patented June 22, 1915.

Application filed October 11, 1912, Serial No. 725,168. Renewed December 9, 1914. Serial No. 876,360.

*To all whom it may concern:*

Be it known that I, ANDREW STRAND, a citizen of the United States, residing at Minneapolis, in the county of Hennepin and State of Minnesota, have invented certain new and useful Improvements in Motor-Cycles; and I do hereby declare the following to be a full, clear, and exact description of the invention, such as will enable others skilled in the art to which it appertains to make and use the same.

My invention relates particularly to motor cycles and has for its object to provide certain improvements in the frame structure thereof, whereby the frame is given the desired resilience, and provision is made for adjustments of the front and rear driving chains.

To such ends, generally stated, the invention consists of the combination of devices, hereinafter described and defined in the claims.

In the accompanying drawings, which illustrate the invention, like characters indicate like parts throughout the several views.

Referring to the drawings, Figure 1 is a view in side elevation with some parts broken away, illustrating my invention as incorporated in the framework of a motor cycle; Fig. 2 is a detail view in side elevation showing features of my invention applied in the framework of a motor cycle; Fig. 3 is a front elevation of the parts shown in Fig. 2; and Fig. 4 is a section, taken on the line $x^4$ $x^4$ of Fig. 2.

Of the parts of the motor cycle, the numeral 1 indicates the rear or traction wheel, the numeral 2 the frame loop, the numeral 3 the gasolene tank, the numeral 4 the lower rear stays, the numeral 5 the upper rear stays, the numeral 6 the rear forks, and the numeral 7 the mud guard structure, which latter feature, however, constitutes no part of the present invention. It will be noted that forwardly projecting portions of the stays 4 and 5 are rigidly connected to a segmental tie bar $5^a$ located just beneath the forward upper portion of the mud guard. The rear wheel 1 is journaled in the usual way on a rear bearing spindle 8, adjustably connected in the customary way to the rear fork 6.

The numeral 9 indicates the engine crank shaft, the engine being removed. This shaft is supported from the frame loop 2 in the usual or any suitable way, and carries the usual driving sprocket 10.

The numeral 11 indicates a usual sprocket, carried by the hub or the rear wheel 1.

The numerals 12 and 13 indicate sprockets which are journaled on a spindle $14^a$ and are adapted to be connected at will through the customary or any suitable clutch mechanism, such, for instance, as the usual well known multiple disk clutch. The front driving chain 14 runs over the sprockets 10 and 12, while a rear driving chain 15 runs over the sprockets 11 and 13. This much would be, substantially, the ordinary or standard motor cycle construction.

In carrying out my invention, I rigidly secure to the rear leg or seat post of the frame loop 2 a strong bearing bracket 16 that is formed with a cylindrical bearing hub $16^a$ and a bifurcated seat $16^b$. The lower end of a spring 17, which is preferably made up of a number of leaf sections, is bolted or rigidly clamped in the seat $16^b$ of the bracket 16, and the upper end of this spring is connected to the upper ends of the upper rear stays 5 by short laterally spaced links 18. This spring arm 17 completes the rear frame structure and gives resilience to the machine frame, without requiring the upper and rear frame stays to be connected together for pivotal movements; but, on the contrary, permitting the same to be integrally formed or otherwise rigidly connected to the corresponding rear forks 6.

Mounted upon the rear spindle $14^a$ is an eccentric, preferably made up of axially alined hubs or sections 19 that are seated for rotary adjustments in the hub $16^a$ of the bracket 16. These eccentric hubs 19 are provided with sleeves $19^a$ that are concentric to the axis of the spindle $14^a$ and, on these concentric hubs $19^a$, the sleeve-like inner ends $4^a$ of the lower rear stays 4 are seated between the eccentric 19 and retaining washers $6^a$ (see particularly Fig. 4). The spindle $14^a$ has a collar $14^b$ that engages one of the washers $6^a$ and is provided with a nut $14^c$, that engages the other rear fork. By tightening the nut $14^c$, the eccentric 19 will be clamped between the rear forks and the hub $16^a$ and thereby held in any desired adjustment. The heads $4^a$ of the lower rear stays 4 are, however, left free for oscillatory movements on the concentric sleeves $19^a$.

It will, of course, be understood that the engine shaft 9 occupies a relatively fixed position in respect to the frame loop 2; and it is evident that, by rotary adjustments of the eccentrics 19, the spindle 14ª may be drawn forward or rearward in respect to the said engine shaft 9 so as to thereby take up the slack of the front driving chain 14. Inasmuch as, however, the sleeves 19ª are concentric to the axis of the spindle 14ª, it is evident that any such adjustments of the spindle 14ª to take up the slack of the front chain 14 will not change the distance between the axis of the two sprockets 11 and 12 and, hence, will not alter any set adjustment in the slack of the rear chain 15. Of course, the slack of the said rear chain 15 may be taken up in the usual way by adjustments of the rear spindle in the rear forks 6. It is thus evident that I have provided an extremely simple and efficient means for adjusting the frame to take up the slack of the front driving chain, without disturbing or altering the adjustment of the rear driving chain or chains. It is also evident that the vertical oscillatory movements of the frame sections, which are permitted by the spring arm 17, will not vary the distance between the axes of the sprockets 11 and 12 and, hence, will not change the slack of the rear chain 15 and, of course, will not alter the slack of the front chain 14.

It will, of course, be understood that frictional driving belts and coöperating pulleys or groove wheels may be used in lieu of the sprockets and chains and, hence, for the purpose of a broad statement, the chains may be designated as driving belts and the sprockets or sheaves as transmission wheels.

What I claim is:—

1. In a motor cycle, the combination with the framework, crank shaft and traction wheel, the said framework including lower rear stays to the rear ends of which said traction wheel is journaled, of a cylindrical bearing secured to said framework intermediate of said crank shaft and traction wheel, a spindle extended eccentrically through said bearing, an eccentric on said spindle adjustably mounted in said bearing and having sleeves that are concentric to said spindle and on which the front ends of said lower rear stays are mounted, a sprocket on said crank shaft, a sprocket on said traction wheel, two sprockets on said spindle, and two chains, one running over the sprocket on said crank shaft and over one of said intermediate sprockets, and the other over the sprocket on said traction wheel and over the other intermediate sprocket.

2. In a motor cycle, the combination with the framework, crank shaft and traction wheel, the said framework including lower rear stays to the rear ends of which said traction wheel is journaled with freedom for forward and rearward adjustments, of a cylindrical bearing secured to said framework intermediate of said crank shaft and traction wheel, a spindle extended eccentrically through said bearing, a pair of eccentrics on said spindle adjustably mounted in said bearing and having sleeves that are concentric to said spindle and on which the front ends of said lower rear stays are mounted, means for clamping said eccentrics to said bearing for different adjustments, a sprocket on said crank shaft, a sprocket on said traction wheel, two sprockets on said spindle secured to rotate together, and two chains, one running over the sprocket on said crank shaft and over one of the said intermediate sprockets, and the other chain running over the sprocket on said traction wheel and over the other intermediate sprocket.

3. In a motor-cycle, the combination with a framework having pivotally connected sections, of two intermediate drive wheels journaled for common rotation around the axis of the pivotal connection between said frame sections, a driving wheel journaled on the front frame section, a driven wheel journaled on the rear frame section, a driving belt running over said front driving wheel and one of the said intermediate wheels, and another driving belt running over the other intermediate wheel and over the rear driven wheel.

4. In a motor-cycle, the combination with a framework having pivotally connected sections, of two intermediate drive wheels journaled for common rotation around the axis of the pivotal connection between said frame sections, a driving wheel journaled on the front frame section, a driven wheel journaled on the rear frame section, a driving belt running over said front driving wheel and one of the said intermediate wheels, another driving belt running over the other intermediate wheel and over the rear driven wheel, and means incorporated in the pivotal connection between said frame sections and operative to simultaneously adjust the said two intermediate sprockets and rear frame section forwardly and rearwardly in respect to the front frame section.

In testimony whereof I affix my signature in presence of two witnesses.

ANDREW STRAND.

Witnesses:
 EDITH E. HANNA,
 HARRY D. KILGORE.